United States Patent
Van Erp

(10) Patent No.: US 7,982,414 B2
(45) Date of Patent: Jul. 19, 2011

(54) METHOD AND DEVICE FOR DRIVING AN ARRAY OF LIGHT SOURCES

(75) Inventor: Josephus Adrianus Maria Van Erp, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 391 days.

(21) Appl. No.: 12/306,008

(22) PCT Filed: Jun. 21, 2007

(86) PCT No.: PCT/IB2007/052404
§ 371 (c)(1),
(2), (4) Date: Dec. 22, 2008

(87) PCT Pub. No.: WO2008/007268
PCT Pub. Date: Jan. 17, 2008

(65) Prior Publication Data
US 2009/0278473 A1    Nov. 12, 2009

(30) Foreign Application Priority Data
Jun. 23, 2006 (EP) ..................... 06115984

(51) Int. Cl.
*H05B 37/00* (2006.01)
(52) U.S. Cl. ...................... 315/312; 315/307
(58) Field of Classification Search ................ 315/291, 315/294, 295, 312, 307
See application file for complete search history.

(56) References Cited

U.S. PATENT DOCUMENTS

| | | | |
|---|---|---|---|
| 6,714,895 B2 * | 3/2004 | Williams et al. | 702/188 |
| 7,317,288 B2 * | 1/2008 | Lin et al. | 315/291 |
| 7,397,195 B2 * | 7/2008 | Yu et al. | 315/194 |
| 7,659,674 B2 * | 2/2010 | Mueller et al. | 315/291 |
| 2004/0181372 A1 | 9/2004 | Williams et al. | |
| 2004/0212321 A1 | 10/2004 | Lys et al. | |
| 2004/0223275 A1 | 11/2004 | Yanagida et al. | |
| 2005/0035728 A1 | 2/2005 | Schanberger et al. | |
| 2005/0253929 A1 | 11/2005 | Kock | |
| 2006/0056855 A1 | 3/2006 | Nakagawa et al. | |

FOREIGN PATENT DOCUMENTS

| | | |
|---|---|---|
| DE | 4232618 A1 | 3/1994 |
| DE | 102004005808 A1 | 8/2004 |
| EP | 0319440 A1 | 6/1989 |
| EP | 0360543 A1 | 3/1990 |
| EP | 0364577 A1 | 4/1990 |
| EP | 1555859 A1 | 7/2005 |
| GB | 2314432 A | 12/1997 |
| WO | 9641408 | 12/1996 |

* cited by examiner

Primary Examiner — Don P Le
(74) Attorney, Agent, or Firm — Mark L. Beloborodov

(57) ABSTRACT

An illumination system (1) comprises a plurality of light source assemblies (10) and a common controller (21). Each light source assembly (10) comprises a plurality of individually controllable light sources (11, 12, 13) for generating light of mutually different colors. The controller is designed to generate a plurality of switched frequency signals ($S_{F1}$, $S_{F2}$, $S_{F3}$) for the respective light sources, with a frequency within a relatively small frequency band, the different frequency signals ($S_{F1}$, $S_{F2}$, $S_{F3}$) having mutually different frequencies ($f_1$, $f_2$, $f_3$). In each light source assembly, each light source is responsive to a respective one of said switched frequency signals ($S_{F1}$, $S_{F2}$, $S_{F3}$), the light source being ON for as long as the respective switched frequency signal is zero and being OFF for as long as the respective switched frequency signal has the respective frequency.

13 Claims, 5 Drawing Sheets

METHOD AND DEVICE FOR DRIVING AN ARRAY OF LIGHT SOURCES

This application is a national stage application under 35 U.S.C. §371 of International Application No. PCT/IB2007/052404 filed on Jun. 21, 2007, and published in the English language on Jan. 17, 2008, as International Publication No. WO/2008/007268, which claims priority to European Application No. 06115984.4, filed on Jun. 23, 2006, incorporated herein by reference.

FIELD OF THE INVENTION

The present invention relates in general to the field of color illumination. More particularly, the present invention relates to an illumination device comprising a plurality of light sources, of which the color and the luminance level is controllable. In the following explanation, it will be assumed that each light source is implemented as a LED, but the present invention can also be practiced with other types of light sources, for instance TL lamps, halogen lamps, etc.

BACKGROUND OF THE INVENTION

Generally speaking, there is a desire for illumination devices that are capable of generating light with a variable light intensity (dimming) and variable color. As should be clear to a person skilled in the art and therefore needs no elaborate explanation, it is possible to generate light of all possible colors in a large portion of the color gamut with an arrangement that comprises three primary LEDs generating light of mutually different colors. In a typical example, one LED generates RED light, a second LED generates GREEN light, and a third LED generates BLUE light. The combined light output of these three primary LEDs has a mixed color within the color triangle defined by the colors of these three primary LEDs, and the exact color point within this color triangle depends on the mutual ratios of the intensities of the three primary LEDs. Thus, varying the color point of the arrangement can be done by changing the relative intensity of one of the three primary LEDs, whereas varying the intensity of the light output while maintaining the color point can be done by changing the intensities of all primary LEDs to the same extent.

It is noted that it is possible to use more than three primary LEDs with mutually different colors; in such case, the present invention can also be applied, with suitable adaptations, as will become clear to a person skilled in the art.

In the following, a basic assembly comprising three (or more) different primary light sources will be indicated by the phrase "spot". Thus, in its smallest implementation, a spot comprises exactly three LEDs. However, it is possible that a primary light source is implemented by an array of mutually substantially identical LEDs, each generating substantially the same color, which are connected in a parallel and/or series arrangement to increase the light output. In the following, it will be assumed that each primary light source is implemented by one LED.

For controlling the intensities of the respective primary light source, a spot is provided with a microcontroller. The microcontroller has an input for receiving a set signal, for instance from a central microcontroller or PC. The microcontroller further has three control outputs, one for each LED, for controlling the operation of the respective LEDs. Typically, the LEDs are operated with a variable duty cycle to achieve variation of the respective light intensities.

An illumination system may comprise two or more spots which should be operated in the same way, i.e. produce the same light color and intensity level. Thus, with increasing number of spots, the number of microcontrollers also increases. This poses a problem in terms of costs, since the microcontrollers are the major cost factor in a spot.

The present invention aims to overcome this problem. More specifically, the present invention aims to provide a relatively simple and low-cost illumination system comprising two or more spots, which can operate with only one single common controller.

SUMMARY OF THE INVENTION

To this end, the present invention provides a communication system that requires only two wires, carrying supply power for the LEDs as well as command signals for the LEDs.

It is noted that EP-1.555.859 discloses a communication system for an illumination system where a plurality of LEDs are controlled via a common two-wire bus that carries supply power for the LEDs as well as command signals for the LEDs. In this prior art system, the command signals are coded messages. Each message contains a coded address indicating the LED for which the message is intended, and a coded instruction indicating the action the LED is required to perform. Although this system does implement a central control, indeed, it is nevertheless rather complicated and costly in that each spot needs to have an intelligent device (such as a microprocessor) for receiving, decoding and processing the coded instructions.

In a system proposed by the present invention, the command signals are much simpler and control the respective LEDs directly. A command signal is implemented as a signal within a small frequency band, which signal is either present or absent. For different LEDs, different frequency bands are used. Each spot comprises filters corresponding to the respective frequency bands. A LED is directly controlled with the output signal of such filter: presence or absence of the signal means ON or OFF of the LED, so the duty cycle control of the LEDs is directly controlled by the central controller through duty cycle control of the command signals.

BRIEF DESCRIPTION OF THE DRAWINGS

These and other aspects, features and advantages of the present invention will be further explained by the following description with reference to the drawings, in which same reference numerals indicate same or similar parts, and in which.

DETAILED DESCRIPTION OF THE INVENTION

Figure 1:
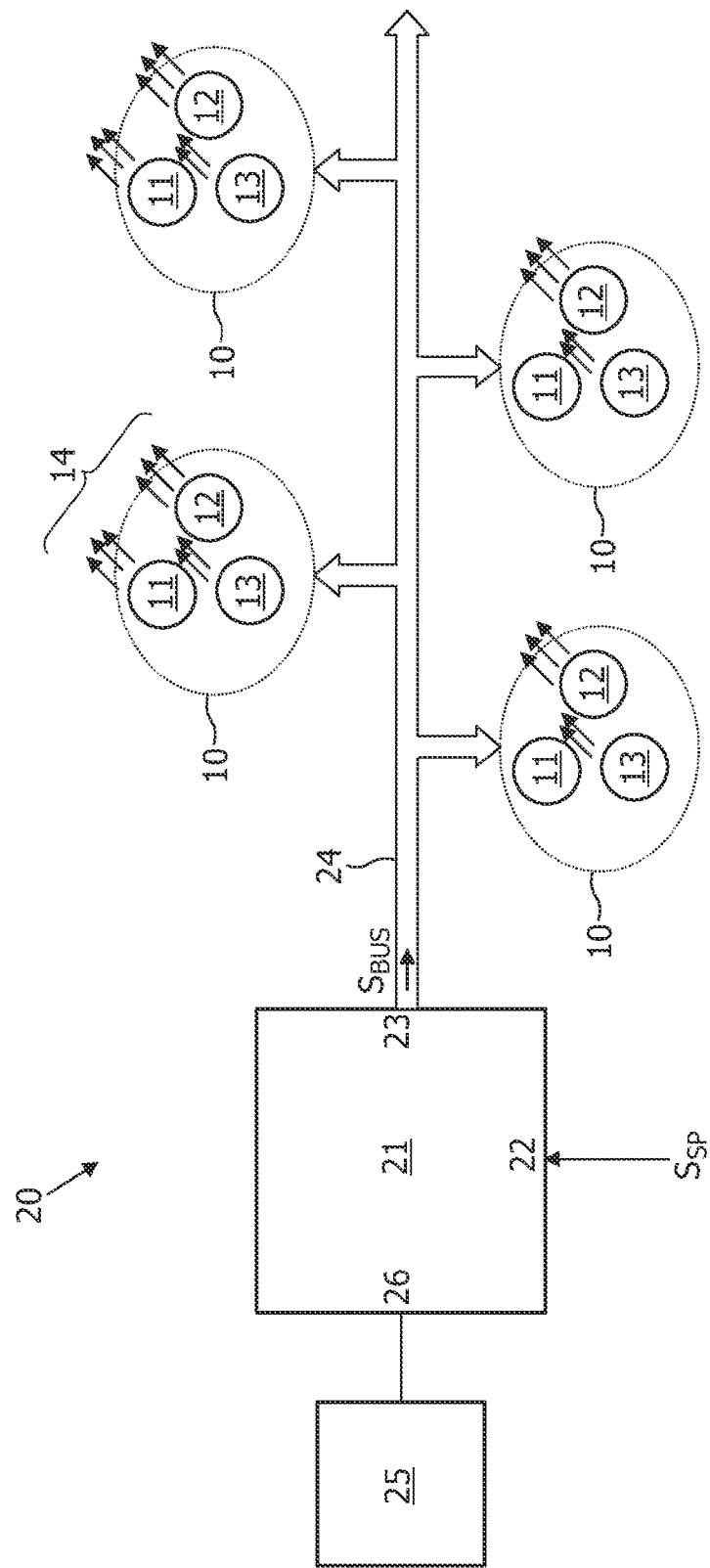
FIG. 1 is a block diagram schematically showing an illumination system.

FIG. 1 schematically shows an illumination system 1, comprising a plurality of light source assemblies 10 and a control system 20. The Fig. shows four light source assemblies 10, but the number of light source assemblies may be three or less or may be five or more. In the following, a light source assembly will briefly be termed "spot".

Each spot 10 comprises a plurality of primary light sources 11, 12, 13. The Fig. shows three primary light sources per spot, but the number of primary light sources may be more than three. In a preferred embodiment, the primary light sources are constituted by LEDs, although other types of light sources are also possible. Each primary light source may be constituted by one single LED (or other type of light source), but a primary light source may also be constituted by a plurality of LEDs (or other type of light source) connected in series and/or in parallel to increase the light output. The primary light sources 11, 12, 13 of one spot are mutually different, in that they generate light of mutually different colors, typically red, green, blue. Although the number of LEDs (or other type of light source) per primary light source may be different for different spots, the spots are mutually substantially identical in that the primary light sources 11, 12, 13 of different spots generate light of mutually the same color (i.e. each spot generates the set of red, green and blue light).

Each spot 10 generates spot output light 14 that is a mixture of the light emitted by the respective primary light sources 11, 12, 13 of the spot. The spot output light 14 has a color that depends on the intensity ratio of the respective light source outputs. By varying the intensity of one or more light source outputs, the color and/or intensity of the spot output light 14 is varied. The control system 20 of the illumination system 1 is designed to control the individual lamps of the spots in such a way, that each spot generates substantially the same mixture color at substantially the same mixture intensity.

The control system 20 comprises a common controller 21, having an input for receiving a set point signal Ssp, for instance from a user, or from an external microcontroller or PC (not shown). The controller 21 further has an output 23 connected to a two-wire control bus 24. The controller 21 is designed to generate an output signal $S_{BUS}$ at its output 23 on the basis of the set point signal Ssp received at its input 22, the output signal $S_{BUS}$ containing power as well as control signals for the spots 10. All spots are connected in parallel to the bus 25, so all spots receive the same input signals. At a power input 26, the controller 21 is powered from a general power supply, which may be a battery or the like, but which in the example of FIG. 1 is shown as an AC/DC converter 25 which in turn is powered from mains.

Figure 2:
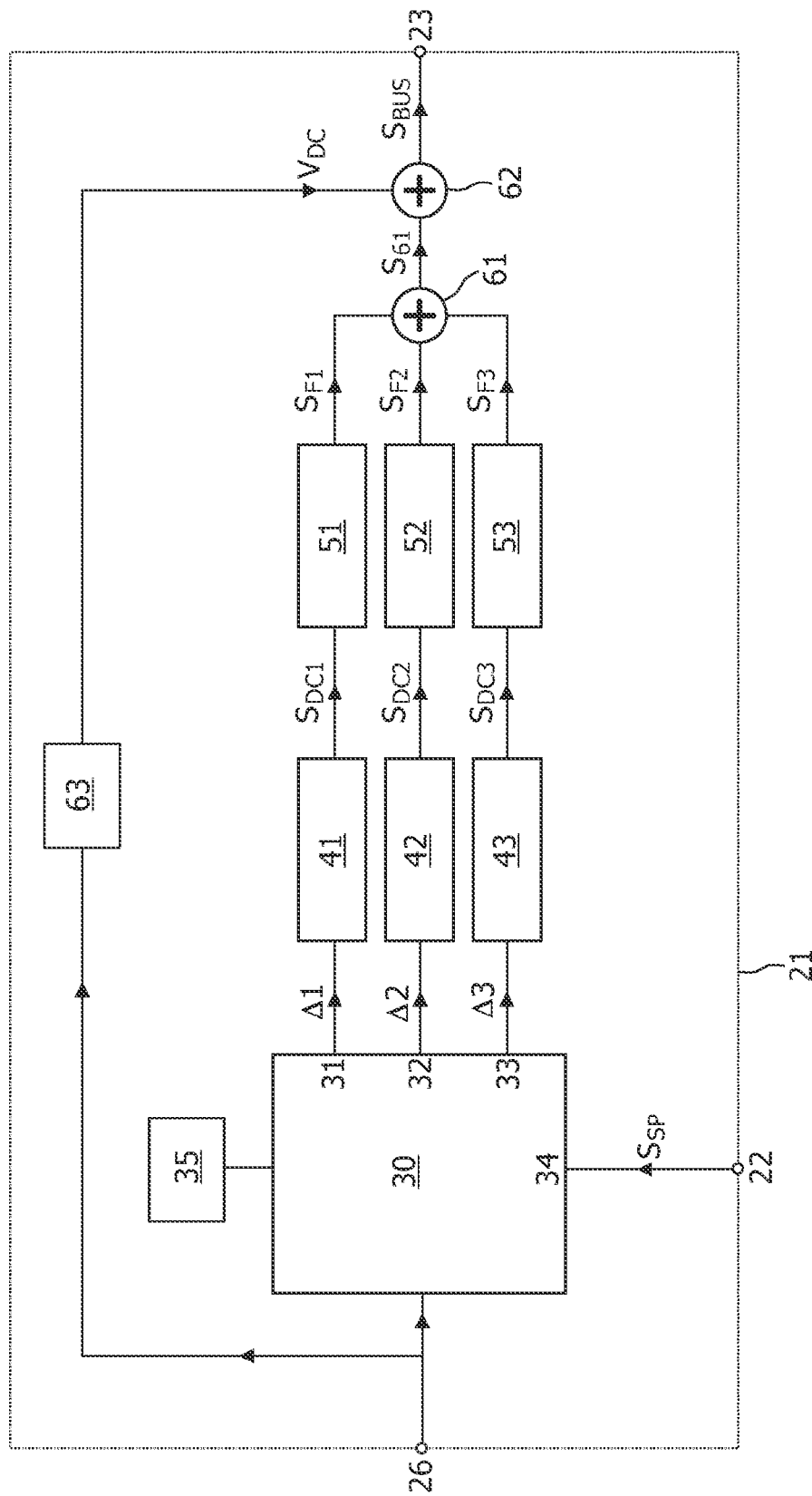
FIG. 2 is a block diagram illustrating an embodiment of a controller in more detail.

FIG. 2 is a block diagram illustrating an embodiment of the controller 21 in more detail. The controller 21 comprises a calculator 30, having three outputs 31, 32, 33, and having an input 34 receiving the set point signal Ssp from controller input 22. On the basis of the set point signal, and further based on color setting information (e.g. a lookup table, a formula or the like) in an associated memory 35, the calculator 30 calculates operative duty cycles $\Delta 1$, $\Delta 2$, $\Delta 3$ for the respective LEDs 11, 12, 13. The calculator 30 has outputs 31, 32, 33 for outputting signals representing the duty cycles $\Delta 1$, $\Delta 2$, $\Delta 3$, respectively. It is noted that color control by controlling the duty cycle of different light sources is a known per se technique, so a detailed explanation thereof is not needed here. It suffices to say that a duty cycle $\Delta$ represents the ratio of the duration of a lamp ON time to the duration of a lamp period, and can for instance be expressed as a percentage or as a number between 0 and 1.

The controller 21 further comprises duty cycle generators 41, 42, 43, receiving the duty cycles $\Delta 1$, $\Delta 2$, $\Delta 3$, respectively, from the calculator 30. Each duty cycle generator 41, 42, 43 is operative to generate a duty cycle signal $S_{DC1}$, $S_{DC2}$, $S_{DC3}$, respectively. Each duty cycle signal is a signal having either a HIGH value or "1" or a LOW value or "0". As will be explained, the LEDs of the spots are ON when the duty cycle signal has its HIGH value and are OFF when the duty cycle signal has its LOW value, or, alternatively, the LEDs of the spots are OFF when the duty cycle signal has its HIGH value and are ON when the duty cycle signal has its LOW value. In any case, the period of the duty cycle signal determines the period of the LED current, and the ratio of HIGH signal value duration to LOW signal value duration determines the duty cycle of the LED current, which is set to be equal to the duty cycle $\Delta$ received from the calculator 30. It is noted that each duty cycle generator can be implemented by a block pulse generator such as known per se. It is further noted that the signal periods of the duty cycle signals $S_{DC1}$, $S_{DC2}$, $S_{DC3}$ generated by the different duty cycle generators 41, 42, 43 may be mutually identical, but this is not essential.

It is noted that the duty cycle generators 41, 42, 43 may be integrated with the calculator 30.

The controller 21 further comprises controllable frequency generators 51, 52, 53, receiving the duty cycle signals $S_{DC1}$, $S_{DC2}$, $S_{DC3}$, respectively, from the duty cycle generators 41, 42, 43. Each frequency generator 51, 52, 53 is capable of generating a frequency signal with a predefined frequency f1, f2, f3, respectively, preferably a sine-shaped waveform with a single frequency or within a relatively small frequency band. The frequencies f1, f2, f3 of the different frequency generators 51, 52, 53 are mutually different. Suitable values for the frequencies f1, f2, f3 are, for instance, 57 kHz, 73 kHz, 127 kHz.

The frequency generators 51, 52, 53 are controllable in that they do or don't generate the frequency signal in conformity with the duty cycle signals $S_{DC1}$, $S_{DC2}$, $S_{DC3}$, respectively, received as control signals. For instance, it is possible that a frequency generator continuously generates the frequency signal, and that the frequency generator at its output is provided with a switch, controlled by the duty cycle signal, either passing or blocking the frequency signal. It is also possible that a frequency generator is switched ON and OFF by the duty cycle signal. In any case, the output signal $S_{F1}$, $S_{F2}$, $S_{F3}$, of the frequency generator 51, 52, 53, respectively, is a switched signal that either is zero or is an alternating signal having the corresponding frequency f1, f2, f3. In the following, it will be assumed that the output signal $S_{F1}$, $S_{F2}$, $S_{F3}$, of the frequency generator 51, 52, 53, respectively, is zero when the corresponding duty cycle signal $S_{DC1}$, $S_{DC2}$, $S_{DC3}$, respectively, is LOW, and that the output signal $S_{F1}$, $S_{F2}$, $S_{F3}$ is the alternating signal having the corresponding frequency f1, f2, f3 when the corresponding duty cycle signal $S_{DC1}$, $S_{DC2}$, $S_{DC3}$, respectively, is HIGH.

It is noted that the alternating signal may alternate between a negative value and a positive value, but it is also possible that the alternating signal alternates between zero and a negative or positive value.

It is noted that the frequency generators 51, 52, 53 may be integrated with the duty cycle generators 41, 42, 43, respectively, and together they may be integrated with the calculator 30.

The controller 21 further comprises a first adder 61 receiving the output signals $S_{F1}$, $S_{F2}$, $S_{F3}$, of the frequency generators 51, 52, 53, respectively. Thus, the first adder 61 provides an output signal S61 that contains the signal components of all output signals $S_{F1}$, $S_{F2}$, $S_{F3}$, of the frequency generators 51, 52, 53, respectively.

The controller 21 further comprises a second adder 62, receiving the output signal S61 from the first adder 61, and also receiving a constant voltage $V_{DC}$, which may be identical to the voltage received at power input 26, or which may be derived from this voltage by a constant voltage source 63. It is noted that the second adder 62 may be integrated with the first adder 61.

The output of the second adder 62 is coupled to the output 23 of the controller 21. Thus, the bus 24 carries a bus signal $S_{BUS}$ that is a combination of a direct voltage $V_{DC}$ and three switched frequency signals $S_{F1}$, $S_{F2}$, $S_{F3}$. This is illustrated in FIG. 3, which is a graph showing the three duty cycle signals $S_{DC1}$, $S_{DC2}$, $S_{DC3}$, the three switched frequency signals $S_{F1}$, $S_{F2}$, $S_{F3}$, and the bus signal $S_{BUS}$ as a function of time.

Figure 3:
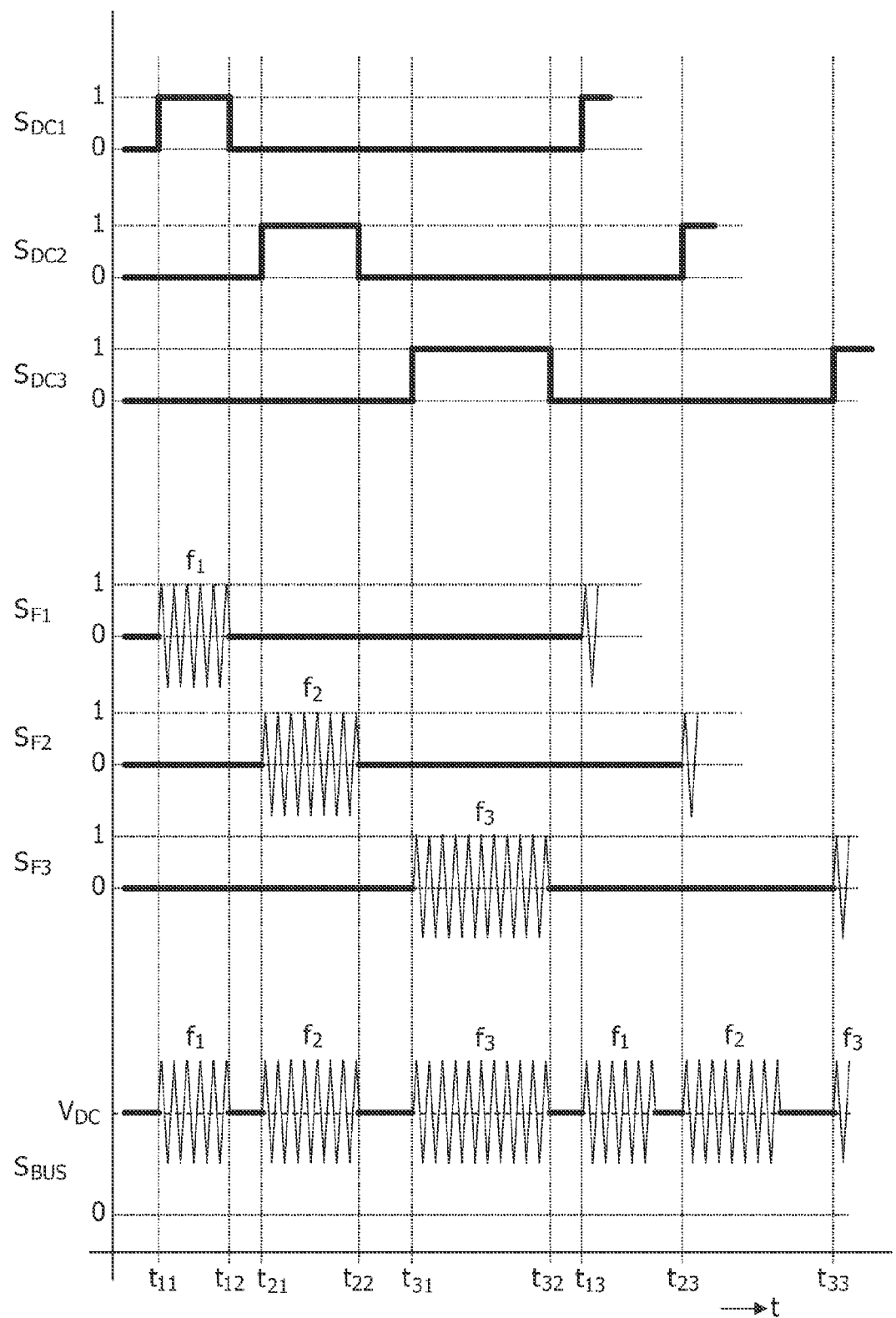
FIG. 3 is a graph schematically illustrating signals in the controller of FIG. 2.

In FIG. 3, the first duty cycle signal $S_{DC1}$ is shown to be HIGH from a time $t_{11}$ to a time $t_{12}$, and is shown to be LOW from the time $t_{12}$ to a time $t_{13}$, so the first period $T_1$ is equal to $t_{13}-t_{11}$. Likewise, the second duty cycle signal $S_{DC2}$ is shown to be HIGH from a time $t_{21}$ to a time $t_{22}$, and is shown to be LOW from the time $t_{22}$ to a time $t_{23}$, so the second period $T_2$ is equal to $t_{23}-t_{21}$. Likewise, the third duty cycle signal $S_{DC3}$ is shown to be HIGH from a time $t_{31}$ to a time $t_{32}$, and is shown to be LOW from the time $t_{32}$ to a time $t_{33}$, so the third period $T_3$ is equal to $t_{33}-t_{31}$. The three periods T1, $T_2$, $T_3$ are shown to be mutually equal, but this is not essential. Further, for sake of clarity, $t_{21}$ is shown to be later than $t_{12}$, and $t_{31}$ is shown to be later than $t_{22}$, whereas $t_{13}$ is shown to be later than $t_{32}$, so that the three HIGH intervals do not overlap; however, such overlap is very well possible.

It is noted that in this preferred embodiment the bus 24 carries power as well as control signals over the same line, which, for closing the signal loop, is a 2-wire bus. Alternatively, it is possible that power and control signals are separated, in which case the control signals are carried over the same line and the power is carried on a different line. In such case, a 4-wire bus is required, or a 3-wire bus if the control signals and the power share a common return line.

Figure 4:
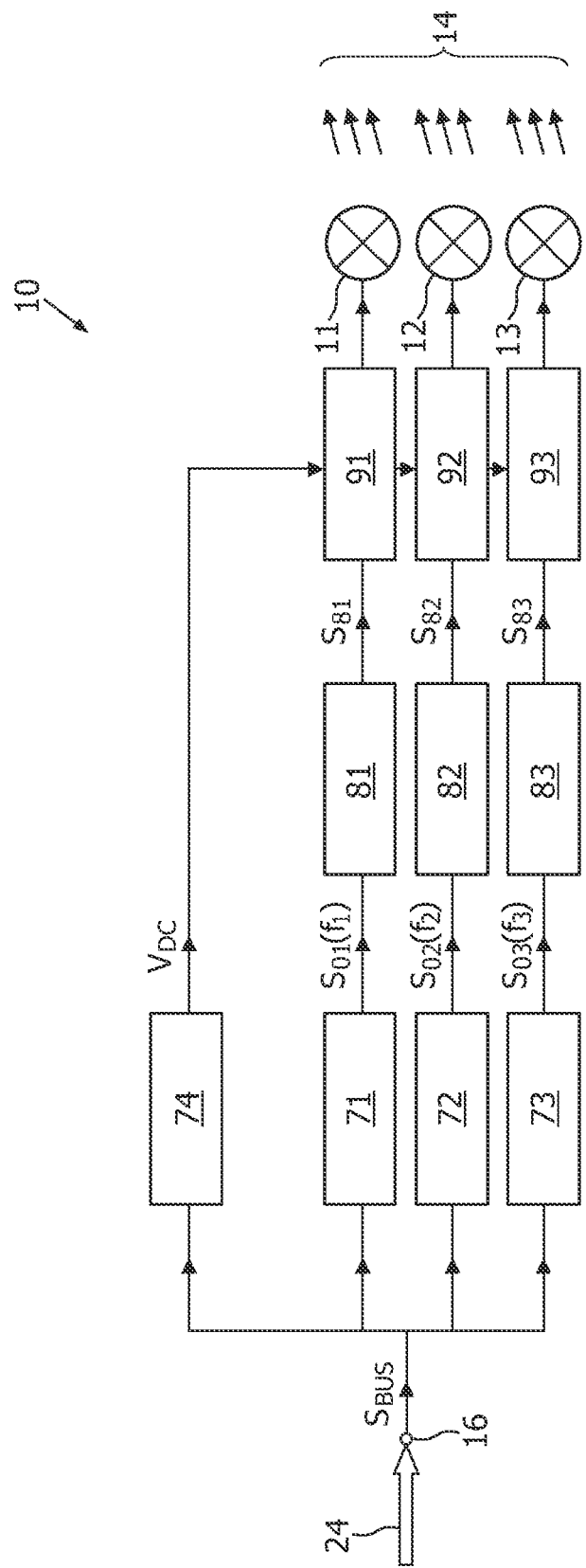
FIG. 4 is a block diagram illustrating an embodiment of a light source assembly in more detail.

FIG. 4 is a block diagram schematically illustrating a spot 10 in more detail. The spot 10 has an input 16 connected to the bus 24, thus receiving the bus signal $S_{BUS}$. The spot further comprises band pass filters 71, 72, 73, having their respective inputs coupled to the spot input 16. Each band pass filter 71, 72, 73 is designed to pass the signal components within a small frequency band around the frequencies f1, f2, f3 of the frequency generators 51, 52, 53, respectively, and to block signal components outside said frequency band, including DC. Thus, the first band pass filter 71 outputs a filtered signal $S_{O1}$ that corresponds to the switched frequency signals $S_{F1}$. Likewise, the second band pass filter 72 outputs a filtered signal $S_{O2}$ that corresponds to the switched frequency signals $S_{F2}$, and the third band pass filter 73 outputs a filtered signal $S_{O3}$ that corresponds to the switched frequency signals $S_{F3}$.

The spot 10 further comprises signal detectors 81, 82, 83, receiving the filtered signals $S_{O1}$, $S_{O2}$ and $S_{O3}$, respectively, from the band pass filters 71, 72, 73, respectively. It is noted that signal detectors are known per se, for instance implemented as peak detector, sample and hold detector, etc, so a detailed description of a signal detector is omitted here. Each signal detector 81, 82, 83 is operative to compare the detected amplitude of its input signal with a predetermined threshold level (not shown for sake of simplicity), and to provide an output signal S81, S82, S83 that is either LOW or zero if the detected amplitude of its input signal is lower than said threshold level, or HIGH if the detected amplitude of its input signal is higher than said threshold level. Thus, the output signals S81, S82, S83 correspond to the duty cycle signals $S_{DC1}$, $S_{DC2}$, $S_{DC3}$, respectively. Alternatively, it is also possible that the output signal is HIGH if the detected amplitude of its input signal is lower than said threshold level and LOW if the detected amplitude of its input signal is higher than said threshold level (inverter function).

It is noted that the signal detectors 81, 82, 83, may be integrated with the band pass filters 71, 72, 73, respectively.

The spot 10 further comprises controllable LED drivers 91, 92, 93, receiving the output signals S81, S82, S83, respectively, from the signal detectors 81, 82, 83, respectively, as control signals. It is noted that controllable LED drivers are known per se, so a detailed description of a LED driver is omitted here. Each LED driver 91, 92, 93 is operative to drive a corresponding LED 11, 12, 13. Each LED driver 91, 92, 93 is responsive to its corresponding control signal S81, S82, S83, to switch its corresponding LED 11, 12, 13 ON (generate lamp current) or OFF (no lamp current) in conformity with the status of the corresponding control signal S81, S82, S83. In the preferred embodiment, a LED is OFF when the corresponding switched frequency signal $S_{F1}$, $S_{F2}$, $S_{F3}$ on the bus 24 has a sufficiently high amplitude, and the LED is ON when the corresponding switched frequency signal $S_{F1}$, $S_{F2}$, $S_{F3}$ on the bus 24 is zero. Alternatively, it is also possible that a LED is ON when the corresponding switched frequency signal $S_{F1}$, $S_{F2}$, $S_{F3}$ on the bus 24 has a sufficiently high amplitude, and the LED is OFF when the corresponding switched frequency signal $S_{F1}$, $S_{F2}$, $S_{F3}$ on the bus 24 is zero.

It is noted that a lamp current may be direct current or alternating current.

For powering the LED drivers 91, 92, 93, the spot 10 further comprises a low pass filter 74 having its input coupled to the spot input 16. The low pass filter 74 is designed to pass the signal components having frequencies close to zero, and to block signal components having higher frequencies, especially the frequencies in the range of the frequencies f2, f3, f3 of the frequency generators 51, 52, 53. Thus, the low pass filter 74 outputs the direct voltage $V_{DC}$ generated by the constant voltage source 63. It is noted that, in case of a 3-wire or 4-wire bus, the input of the low pass filter 74 is coupled to a different input (not shown) of the spot 10, connected to the correct wire of the bus.

Figure 5:
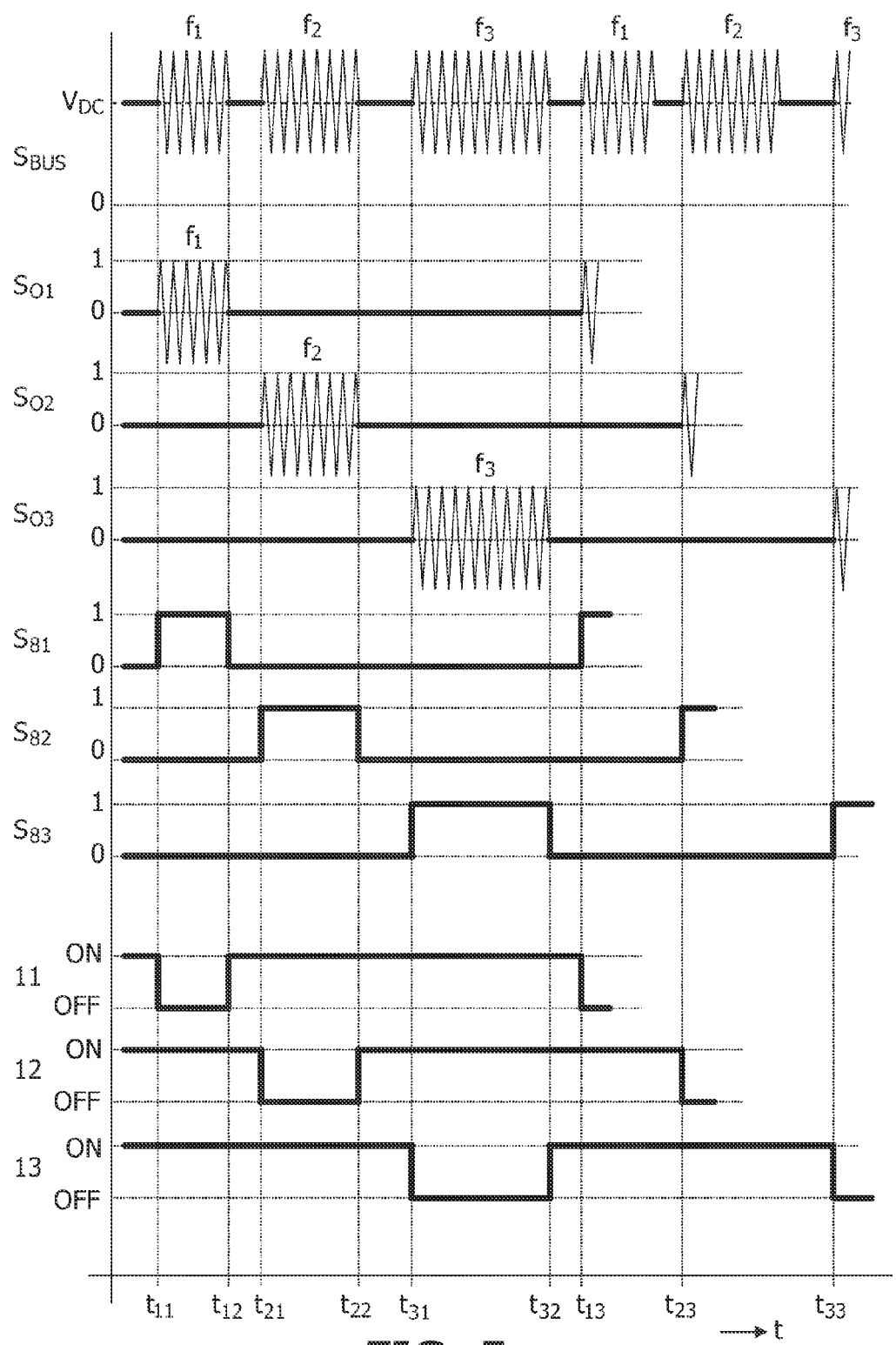
FIG. 5 is a graph schematically illustrating signals in the light source assembly of FIG. 4.

FIG. 5 is a graph showing, as a function of time, bus signal $S_{BUS}$, the three filtered signals $S_{O1}$, $S_{O2}$ and $S_{O3}$, the three detector output signals S81, S82, S83, and the status of the three LEDs 11, 12, 13.

It should be clear that the above explanation applies to each spot, so that all first LEDs 11 of all spots 10 are responsive to mutually the same frequency signals and are driven with mutually identical duty cycles, all second LEDs 12 of all spots 10 are responsive to mutually the same frequency signals and are driven with mutually identical duty cycles, and all third LEDs 13 of all spots 10 are responsive to mutually the same frequency signals and are driven with mutually identical duty cycles.

It should be clear to a person skilled in the art that the present invention is not limited to the exemplary embodiments discussed above, but that several variations and modifications are possible within the protective scope of the invention as defined in the appending claims.

For instance, the illumination system is not necessarily used for color control.

Further, although the present invention allows application of a two-wire bus, the control system of the present application is not necessarily restricted to implementation with a two-wire bus.

Further, each lamp driver may comprise a switch mode power supply for generating the lamp current. Such switch mode power supply operates at a certain switching frequency. It would be preferred that the operating frequency of such switch mode power supply does not coincide with any of the frequencies used in the command signals on the bus 24.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Illumination system, comprising a plurality of light source assemblies and a common controller;
   wherein each light source assembly comprises a plurality of individually controllable light sources for generating light of mutually different colors;
   wherein the controller is operative to generate a plurality of switched frequency signals for the respective light sources, the plurality of switched frequency signals comprising different frequency signals having mutually different frequencies within relatively small frequency bands; and
   wherein, in each light source assembly of the plurality of light source assemblies, each light source is responsive to a respective frequency signal from the plurality of switched frequency signals.

2. Illumination system according to claim 1, wherein each switched frequency signal is switched between a first state where the signal is substantially zero and a second state where the signal has said frequency within said relatively small frequency band, the light source being ON for as long as the respective switched frequency signal is in one of said states and being OFF for as long as the respective switched frequency signal is in the opposite state.

3. Illumination system according to claim 2, the light source being ON for as long as the respective switched frequency signal is in its first state and being OFF for as long as the respective switched frequency signal is in its second state.

4. Illumination system according to claim 1, wherein the common controller is part of a common control system for controlling the operation of the light source assemblies, the control system comprising a control bus, the common controller having an output terminal coupled to the control bus;
   wherein each light source assembly has a control input terminal coupled to the control bus;
   wherein the controller has an input terminal for receiving a set point signal indicating a desired color point for the light generated by at least one light source assembly of the plurality of light source assemblies;
   wherein the controller is configured to generate the plurality of switched frequency signals for the respective light sources based, at least in part, on the set point signal, each switched frequency signal being switched between a first state where the signal is substantially zero and a second state where the signal is an alternating signal with a frequency within a relatively small frequency band,
   wherein the controller is configured to provide a summation of said switched frequency signal at the output terminal as bus signal; and
   wherein, in each light source assembly of the plurality of light source assemblies, each light source is responsive to a respective frequency signal from the plurality of switched frequency signals, the light source being ON for as long as the respective switched frequency signal is in one of said states and being OFF for as long as the respective switched frequency signal is in the opposite state.

5. Illumination system according to claim 4, wherein the control bus is a two-wire control bus.

6. Illumination system according to claim 4, wherein the control bus carries power supply for the light source assemblies.

7. Illumination system according to claim 4, wherein the controller comprises:
   a calculator, operative to calculate, on the basis of the received set point signal, duty cycles for the respective light sources;
   a plurality of duty cycle generators, each duty cycle generator being responsive to a respective duty cycle received from the calculator to generate a duty cycle signal that alternatively has a first value (HIGH) and a second value (LOW), such that the duty cycle of the duty cycle signal corresponds to the respective duty cycle received from the calculator; and
   a plurality of frequency generators, each frequency generator being responsive to a respective duty cycle signal received from a respective duty cycle generator to generate said switched frequency signal in conformity with the respective duty cycle signal.

8. Illumination system according to claim 7, wherein a frequency generator outputs an alternating signal with a frequency within a relatively small frequency band for as long as the respective duty cycle signal has the first value (HIGH), and wherein a frequency generator outputs a zero signal for as long as the respective duty cycle signal has the second value (LOW).

9. Illumination system according to claim 7, wherein the controller comprises a first adder for adding the switched frequency signals from the frequency generators, wherein the output signal of the first adder is provided as the bus signal.

10. Illumination system according to claim 9, wherein the controller comprises a second adder for adding a DC power signal to the switched frequency signals from the frequency generators, wherein the output signal of the second adder is provided as the bus signal.

11. Illumination system according to claim 4, wherein each light source assembly comprises:
    a plurality of band pass filters, each band pass filter being coupled to receive the bus signal from the assembly input and having a band pass characteristic matching a respective one of said relatively small frequency bands;
    a plurality of controllable lamp drivers, each lamp driver being associated with a respective one of said light sources, each lamp driver being capable of operating in two operative states, wherein the lamp driver generates lamp current when operating in its first operative state and does not generate lamp current when operating in its second operative state;
   wherein each lamp driver sets its operative state in response to the filtered output signal of a respective band pass filters.

12. Illumination system according to claim 11, wherein the lamp driver is operating in its first operative state when the filtered output signal of the respective band pass filter is lower than the predetermined threshold level whereas the lamp driver is operating in its second operative state when the filtered output signal of the respective band pass filter is higher than the predetermined threshold level.

13. Illumination system according to claim 11, wherein each light source assembly further comprises a low pass filter having its input coupled to receive the bus signal from the assembly input, the low pass filter providing a power supply signal for the lamp drivers.

* * * * *